United States Patent
Otsuki

(10) Patent No.: US 9,274,517 B2
(45) Date of Patent: Mar. 1, 2016

(54) NUMERICAL CONTROLLER FOR SPEED CONTROL ACCORDING TO INSTRUCTED PATH SPEED CONDITION

(75) Inventor: Toshiaki Otsuki, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 876 days.

(21) Appl. No.: 13/569,471

(22) Filed: Aug. 8, 2012

(65) Prior Publication Data

US 2013/0116816 A1 May 9, 2013

(30) Foreign Application Priority Data

Nov. 4, 2011 (JP) .................... 2011-242764

(51) Int. Cl.
   *G05B 19/416* (2006.01)
(52) U.S. Cl.
   CPC .... *G05B 19/416* (2013.01); *G05B 2219/43063* (2013.01); *G05B 2219/43065* (2013.01)
(58) Field of Classification Search
   USPC ........................................................ 700/159
   See application file for complete search history.

(56) References Cited

U.S. PATENT DOCUMENTS

| | | | |
|---|---|---|---|
| 5,993,044 A | 11/1999 | Ohto et al. | |
| 2009/0295323 A1 | 12/2009 | Papiernik et al. | |
| 2011/0087375 A1 | 4/2011 | Aurnhammer et al. | |
| 2012/0271446 A1 | 10/2012 | Sato et al. | |

FOREIGN PATENT DOCUMENTS

| | | |
|---|---|---|
| CN | 101556472 A | 10/2009 |
| DE | 10 2009 049 172 | 6/2011 |
| DE | 11 2009 005 397 | 9/2012 |
| JP | 5-241628 A | 9/1993 |
| JP | 6-131018 A | 5/1994 |
| JP | 10-069310 A | 3/1998 |
| JP | 11-33954 A | 2/1999 |
| JP | 2004-220435 A | 8/2004 |
| JP | 2006-43839 A | 2/2006 |
| JP | 2008-225825 | 9/2008 |
| JP | 5013024 B2 | 8/2012 |
| WO | 2011/064816 | 6/2011 |

OTHER PUBLICATIONS

Moriwaki, T., *Mult-Functional Machine Tool*, CIRP Annals—Manufacturing Technology, vol. 57, Issue 2, 2008, pp. 736-749.

*Primary Examiner* — Carlos Ortiz Rodriguez
(74) *Attorney, Agent, or Firm* — Drinker Biddle & Reath LLP

(57) ABSTRACT

A numerical controller that controls a multi-axis machine tool performs speed control based on an instructed path allowable acceleration and an instructed path allowable jerk in a relative path (instructed path) of a tool with respect to a workpiece, and performs speed control based on a tool reference point path allowable speed, a tool reference point path allowable acceleration and a tool reference point path allowable jerk in a tool reference point path being a relative path, with respect to the workpiece, of a point in the tool (tool reference point) that is different from a tool center point. As a result, it is possible to prevent occurrence of large acceleration and jerk in a path of the tool center point with respect to the workpiece, as well as occurrence of large speed, acceleration and jerk in the path of the tool reference point with respect to the workpiece.

16 Claims, 9 Drawing Sheets

FIG. 3
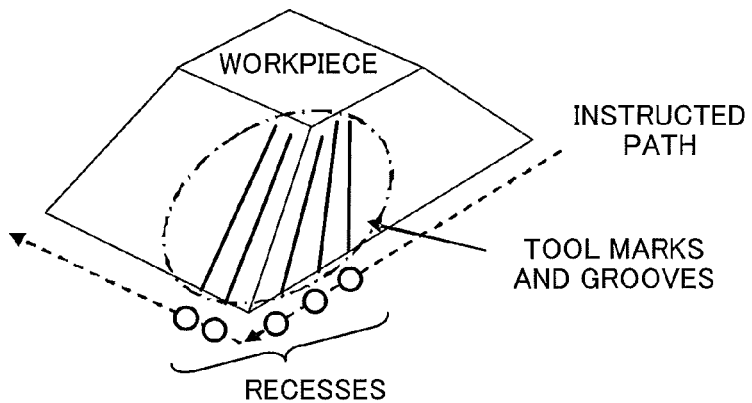
FIG. 4
```
G43.4 X____ Y____ Z____ A____ C____ H____ ;
X____ Y____ Z____ A____ C____ F____ ;
X____ Y____ Z____ A____ C____ ;
X____ Y____ Z____ A____ C____ F____ ;
.....
.....
G49 ;
```
FIG. 5
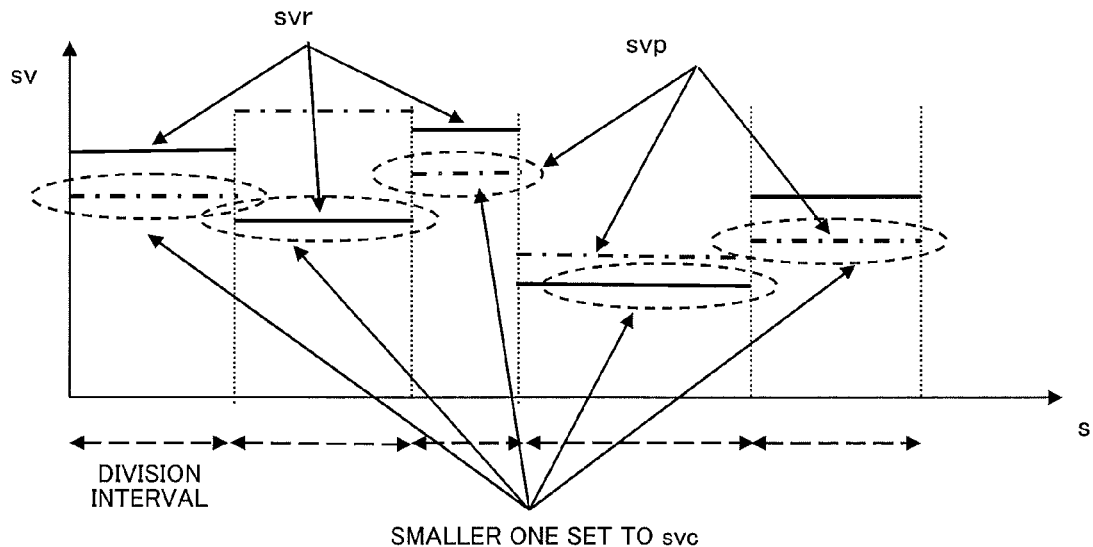

NUMERICAL CONTROLLER FOR SPEED CONTROL ACCORDING TO INSTRUCTED PATH SPEED CONDITION

RELATED APPLICATION DATA

This application claims priority under 35 U.S.C. §119 and/or §365 to Japanese Application No. 2011-242764 filed Nov. 4, 2011, the entire contents of which are incorporated herein by reference.

BACKGROUND OF THE INVENTION

1. Field of the Invention

The present invention relates to a numerical controller that controls a multi-axis machine tool in which a workpiece that is attached to a table is machined by at least three linear axes and one rotation axis. More particularly, the present invention relates to a numerical controller that performs speed control based on an allowable acceleration and an allowable jerk in an instructed path being a relative path of a tool with respect to a workpiece, speed control based on an allowable speed, an allowable acceleration and an allowable jerk in each driving axis, and speed control based on a tool reference point path allowable speed, a tool reference point path allowable acceleration and a tool reference point path allowable jerk in a below-described tool reference point path.

2. Description of the Related Art

In machine tools, a driving axis speed condition such as driving axis allowable speed, driving axis allowable acceleration and driving axis allowable jerk are applied to the driving axes of actual movement. Japanese Patent Application Laid-Open No. 2008-225825 discloses a configuration wherein a driving axis does not exceed an allowable speed, an allowable acceleration or an allowable jerk, through interpolation of an instructed path by working out the speed on the instructed path that satisfies these driving axis speed conditions. The time derivative of acceleration, i.e. the degree of change of acceleration, is referred to as jerk in the above document.

In Japanese Patent Application Laid-Open No. 2008-225825 above, a first derivative, a second derivative and a third derivative, which are time derivatives, are worked out for a movement distance s on an instructed path, in such a manner so as not to exceed the driving axis allowable speed, the driving axis allowable acceleration and the driving axis allowable jerk. On the basis of the first, second and third derivatives, the instructed path is interpolated by changing the distance s, and the driving axes are operated by performing then inverse kinematic conversion. However, Japanese Patent Application Laid-Open No. 2008-225825 above does not suggest the feature of performing speed control based on an instructed path allowable acceleration and an instructed path allowable jerk in an instructed path being a relative path of a tool with respect to the workpiece.

US Patent Application Publication No. 2009/0295323 discloses a technology wherein there is worked out the largest jerk (path jolt r(s)) on an instructed path that satisfies a driving axis speed condition such as driving axis allowable speed, driving axis allowable acceleration and driving axis allowable jerk; the jerk is integrated, to work out acceleration on the instructed path (path acceleration a(s)); the acceleration is integrated to work out speed on that instructed path (path speed v(s)); and the instructed path in interpolated based on that speed. However, the technology disclosed in US Patent Application Publication No. 2009/0295323 does not envisage control of a multi-axis machine tool where machining is performed in at least three linear axes and one rotation axis. Accordingly, there is no distinction between the driving axis speed and the instructed path speed, and there is no assumption that the driving axis path and the instructed path are different for the multi-axis machine tool. Accordingly, US Patent Application Publication No. 2009/0295323 does not suggest the feature of performing speed control based on an instructed path allowable acceleration and an instructed path allowable jerk in an instructed path being a relative path of a tool with respect to a workpiece, which are different from a driving axis allowable speed, driving axis allowable acceleration and driving axis allowable jerk.

International Publication WO 2011/064816 discloses a technology wherein, in a case where a driving axis path is instructed, there is performed interpolation by working out a feed speed on a driving axis path, such that the speed of a tool center point (end point of the tool), with respect to a workpiece, is an allowable speed (reference speed). However, WO 2011/064816 above does not suggest the feature of performing speed control based on an instructed path allowable acceleration and an instructed path allowable jerk in an instructed path being a relative path of a tool with respect to the workpiece.

Performing speed control in such a manner so as not to exceed a driving axis allowable speed, a driving axis allowable acceleration or a driving axis allowable jerk, is a conventional technique, as disclosed in Japanese Patent Application Laid-Open No. 2008-225825 and US Patent Application Publication No. 2009/0295323 above. Ordinarily, a driving axis allowable speed, a driving axis allowable acceleration and a driving axis allowable jerk are set, as set values, through measurement of an allowable speed, an allowable acceleration and an allowable jerk in each driving axis, during manufacture of the machine tool. That is, the driving axis allowable speed, driving axis allowable acceleration and driving axis allowable jerk are ordinarily set, as set values, for parameters and the like in the numerical controller, as machine tool conditions.

In order to perform machining of higher precision and higher quality, speed control is required also based on an instructed path allowable acceleration and an instructed path allowable jerk on an instructed path that is instructed by a machining program. In particular, there is often a large difference between the movement path of the driving axes and the instructed path, which is the travel path of the tool with respect to the workpiece during machining in a multi-axis machine tool where machining is performed in at least three linear axes and one rotation axis. Accordingly, speed control based on an instructed path allowable acceleration and an instructed path allowable jerk of a tool center point on an instructed path which is a relative path of a tool center point with respect to the workpiece and is instructed by a machining program, is an important issue in order to perform machining of higher precision and higher quality. That is because tool marks may be formed on the machined surface if acceleration and jerk in the instructed path are excessive, and grooves may be formed on account of excessive tool infeed.

An instance will be explained wherein, for example, an instructed path being a relative path with respect to a workpiece, of a tool center point that is located in a program coordinate system, is instructed by a machining program, on a program coordinate system, as illustrated in FIG. 1. The actual workpiece is disposed on a table that rotates about two rotation axes (A-axis, C-axis) such as those illustrated in FIG. 2, and is machined by a tool. In the machining program, the instructed path of the tool center point is instructed at X, Y and Z positions on the program coordinate system, the instructed path speed is instructed as a speed F and the tool direction is instructed as a rotation axis position (A-axis and C-axis position) and a tool direction vector (FIG. 1), In this machining program, the X, Y and Z instructions are linear instructions. In actual machining, however, the X, Y and Z-axes, as driving axes, with rotational movement of the A-axis and C-axis, move tracing a curve on a machine coordinate system, as in the driving axis path of FIG. 2. Herein, the driving axes are controlled so as to move within allowable speed, allowable acceleration and allowable jerk, according to conventional technologies. However, no control is performed on the allowable acceleration and allowable jerk of the instructed path, being a relative path of the tool center point with respect to the workpiece. Therefore, large acceleration and/or jerk may occur on the path of the tool center point with respect to the workpiece, in particular at corners in the machining program and at curved portions of large curvature. In such cases, tool marks in the tool length direction may appear on the machined surface, in particular, during machining of the workpiece with the side face of the tool, and grooves may be formed on account of excessive tool infeed. Recesses may also become formed on account of excessive infeed during machining with the tool center point (FIG. 3). The driving axes operate at high speed, high acceleration and high jerk, in particular, in high-rigidity and high-speed machine tools where large allowable speed, allowable acceleration and allowable jerk are set for each driving axis. As a result, large acceleration and jerk occur also in the path of the tool center point with respect to the workpiece, and tool marks, grooves and/or recesses may be formed in such machined surfaces.

Upon machining of a workpiece with the side face of a tool, it is necessary to perform speed control based on the acceleration and jerk of the tool center point, but also speed control based on the allowable speed, allowable acceleration and allowable jerk in the tool reference point path, which is a relative path of the tool reference point with respect to the workpiece, by setting, as the tool reference point, a reference position on the tool different from the tool center point (for instance, a tool position corresponding to a machining top face) (FIG. 1 and FIG. 2). In the machining of FIG. 2, a workpiece is cut with a cutting blade at a part between a tool center point and a tool reference point. Therefore, if no speed control is performed at the tool reference point, similarly to speed control at the tool center point, then tool marks may be formed on the machined surface, and grooves or the like may be formed on account of excessive tool infeed, as in FIG. 3.

SUMMARY OF THE INVENTION

Therefore, it is an object of the present invention to provide a numerical controller that allows realizing machining of higher precision and higher quality by preventing the occurrence of grooves or the like on a machined surface on account of excessive tool infeed, and the occurrence of tool marks derived from large acceleration or jerk in a path of a tool center point with respect to a workpiece, or derived from large speed, acceleration or jerk, on the path of the tool reference point with respect to the workpiece.

The numerical controller according to the present invention is a numerical controller that controls a multi-axis machine tool in which a workpiece that is attached to a table is machined by at least three linear axes and one rotation axis, the numerical controller comprising: an instructed path speed condition input unit that inputs, as an instructed path speed condition, an instructed path speed and an instructed path allowable acceleration in an instructed path, which is a relative path of a tool center point with respect to a workpiece and is instructed by a machining program; a driving axis speed condition input unit that inputs, as a driving axis speed condition, a driving axis allowable speed and a driving axis allowable acceleration for a driving axis; a clamp value computation unit that computes an instructed path interval allowable speed and an instructed path interval allowable acceleration on the basis of the instructed path speed condition, for each of division intervals resulting from dividing the instructed path into a plurality of intervals, further computes a driving axis interval allowable speed and a driving axis interval allowable acceleration on the basis of the driving axis speed condition, sets the smaller value from among the instructed path interval allowable speed and the driving axis interval allowable speed to a speed clamp value, and sets the smaller value from among the instructed path interval allowable acceleration and the driving axis interval allowable acceleration to an acceleration clamp value; a speed curve computation unit that works out a speed curve as a largest speed on the instructed path that does not exceed the speed clamp value or the acceleration clamp value; and an interpolation unit that performs interpolation of the instructed path according to the speed based on the speed curve, and computes a driving axis movement amount through conversion of an interpolated instructed path interpolation position to a driving axis position, wherein each axis is driven in accordance with the driving axis movement amount.

The numerical controller may be configured so that the instructed path speed condition input unit inputs, as an instructed path speed condition, also an instructed path allowable jerk in addition to the instructed path speed and the instructed path allowable acceleration, the driving axis speed condition input unit inputs, as the driving axis speed condition, also a driving axis allowable jerk in addition to the driving axis allowable speed and the driving axis allowable acceleration, the clamp value computation unit, for each of the division intervals: computes also an instructed path interval allowable jerk in addition to the instructed path interval allowable speed and the instructed path interval allowable acceleration, on the basis of the instructed path speed condition that has been inputted; computes also a driving axis interval allowable jerk in addition to the driving axis interval allowable speed and the driving axis interval allowable acceleration, on the basis of the driving axis speed condition that has been inputted; and sets the smaller value from among the instructed path interval allowable jerk and the driving axis interval allowable jerk to a jerk clamp value, in addition to the speed clamp value and the acceleration clamp value, and the speed curve computation unit works out a speed curve as a largest speed on the instructed path that does not exceed the jerk clamp value either in addition to the speed clamp value and the acceleration clamp value.

The numerical controller may be configured so that the numerical controller may further have a tool reference point path speed condition input unit that inputs, as a tool reference point path speed condition, a tool reference point path allowable speed and a tool reference point path allowable acceleration in a tool reference point path being a relative path, with respect to the workpiece, of a tool reference point being a reference point on the tool which is different from the tool center point, wherein the clamp value computation unit, for each of the division intervals: computes the instructed path interval allowable speed and the instructed path interval allowable acceleration, on the basis of the instructed path speed condition that has been inputted; computes the driving axis interval allowable speed and the driving axis interval allowable acceleration, on the basis of the driving axis speed condition that has been inputted; further computes a tool reference point path interval allowable speed and a tool reference point path interval allowable acceleration, on the basis of the tool reference point path speed condition that has been inputted; and sets, to the speed clamp value, the smallest value from among the instructed path interval allowable speed, the driving axis interval allowable speed and the tool reference point path interval allowable speed, and sets, to the acceleration clamp value, the smallest value from among the instructed path interval allowable acceleration, the driving axis interval allowable acceleration and the tool reference point path interval allowable acceleration.

The numerical controller may be configured so that the numerical controller may further have a tool reference point path speed condition input unit that inputs, as a tool reference point path speed condition, a tool reference point path allowable speed, a tool reference point path allowable acceleration and a tool reference point path allowable jerk in a tool reference point path being a relative path, with respect to the workpiece, of a tool reference point being a reference point on the tool which is different from the tool center point, wherein the instructed path speed condition input unit inputs, as the instructed path speed condition, also an instructed path allowable jerk in addition to the instructed path speed and the instructed path allowable acceleration, the driving axis speed condition input unit inputs, as the driving axis speed condition, also a driving axis allowable jerk in addition to the driving axis allowable speed and the driving axis allowable acceleration, the clamp value computation unit, for each of the division intervals: computes also an instructed path interval allowable jerk in addition to the instructed path interval allowable speed and the instructed path interval allowable acceleration, on the basis of the instructed path speed condition that has been inputted; computes also a driving axis interval allowable jerk in addition to the driving axis interval allowable speed and the driving axis interval allowable acceleration, on the basis of the driving axis speed condition that has been inputted; further computes a tool reference point path interval allowable speed, a tool reference point path interval allowable acceleration and a tool reference point path interval allowable jerk, on the basis of the tool reference point path speed condition that has been inputted; and sets, to the speed clamp value, the smallest value from among the instructed path interval allowable speed, the driving axis interval allowable speed and the tool reference point path interval allowable speed, sets, to the acceleration clamp value, the smallest value from among the instructed path interval allowable acceleration, the driving axis interval allowable acceleration and the tool reference point path interval allowable acceleration, and sets, to the jerk clamp value, the smallest value from among the instructed path interval allowable jerk, the driving axis interval allowable jerk and the tool reference point path interval allowable jerk; and the speed curve computation unit works out a speed curve as a largest speed on the instructed path that does not exceed the jerk clamp value either in addition to the speed clamp value and the acceleration clamp value.

The multi-axis machine tool may be a table rotation-type five-axis machine tool having three linear axes and two rotation axes about which a table rotates, a tool head rotation-type five-axis machine tool having three linear axes and two rotation axes about which a tool head rotates, or a mixed five-axis machine tool having three linear axes, one rotation axis about which a tool head rotates, and one rotation axis about which a table rotates.

The present invention succeeds in providing a numerical controller that controls a multi-axis machine tool in which a workpiece that is attached to a table is machined by at least three linear axes and one rotation axis, and that performs speed control based on an instructed path allowable acceleration and an instructed path allowable jerk in an instructed path being a relative path of a tool with respect to the workpiece. The invention succeeds also in providing a numerical controller that performs speed control based on a tool reference point path allowable speed, a tool reference point path allowable acceleration and a tool reference point path allowable jerk in a tool reference point path being a relative path, with respect to the workpiece, of a tool reference point that is different from the tool center point. As a result, the invention allows realizing machining of higher precision and higher quality by preventing the occurrence of tool marks, grooves or the like on a machined surface on account of excessive tool infeed derived from large acceleration or jerk in a path of a tool center point with respect to a workpiece, or derived from large speed, acceleration or jerk, in the path of the tool reference point with respect to the workpiece.

BRIEF DESCRIPTION OF THE DRAWINGS

The abovementioned object and features of the present invention, and other objects and features, will become apparent from the explanation of the examples below with reference to accompanying drawings, wherein:

FIG. 3 is a diagram for explaining tool marks formed on a machined surface, and grooves and recesses that form on account of excessive tool infeed;

FIG. 4 is a diagram for explaining an example of a machining program for machining a workpiece in a table rotation-type five-axis machine tool having three linear axes and two rotation axes about which a table rotates;

FIG. 5 is a diagram for explaining the features of working out allowable speeds svp and svr of an instructed path cumulative length s for each division interval resulting from dividing an instructed path into a plurality of intervals, according to the length s, setting svp and svr to an instructed path interval allowable speed and a driving axis interval allowable speed, respectively, and setting the smaller value from among svp and svr to a speed clamp value svc;

DESCRIPTION OF THE PREFERRED EMBODIMENTS

First Embodiment

Figure 2:
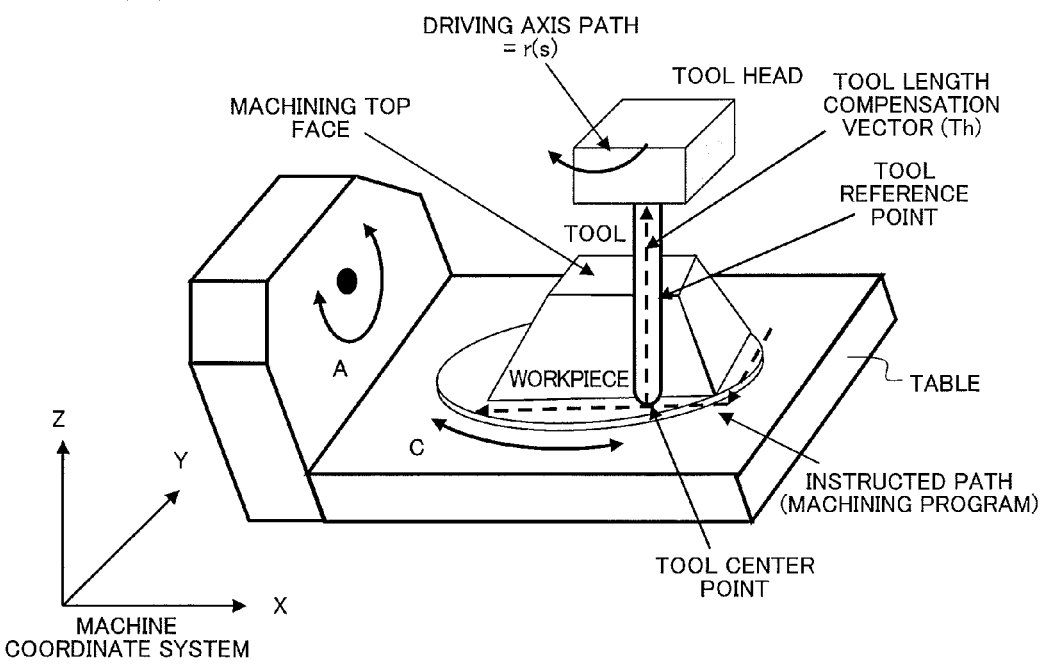
FIG. 2 is a diagram for explaining an instance of machining, using a tool, of a workpiece that is placed on a table that rotates about two rotation axes (A-axis and C-axis)

A table rotation-type five-axis machine tool having three linear axes and two rotation axes about which a table rotates, such as the one in FIG. 2, is used as the multi-axis machine tool that is controlled by the numerical controller according to the present invention. A table rotates about an A-axis and a C-axis, and a tool head is operated in the X, Y and Z-axes. Herein, the table rotates about the A-axis and the C-axis, but may rotate about other rotation axes (B-axis and C-axis, or A-axis and B-axis). There are also instances where the table is operated disposed in the X, Y or Z-axis.

A machining program is instructed for instance as illustrated in FIG. 4. Herein, G43.4 denotes a G code for the start of tool center point control that controls the relative path of a tool center point with respect to a workpiece, and G49 is a G code for canceling tool center point control. Various blocks X_, Y_, Z_ between G43.4 and G49 are instructions of an instructed path, as a relative path of the tool center point with respect to the workpiece. Herein, A_, C_ are instructions for rotation axis movement in order to modify the tool direction along with movement of the tool center point. The tool direction can be instructed by way of vectors, such as I_, J_, K_. An instruction in such an instance can be regarded as identical to that of FIG. 4, through conversion of the instructed tool direction vector to a rotation axis position A_, C_, and hence the present invention can also be used in such an instance. Herein, F denotes an instruction of instructed path speed (F instruction) in the instructed path, such that instruction is performed in varying-speed blocks, and H_ instructs a tool length compensation amount. The present invention is applicable to a program instruction for tool center point control, i.e. from instructions G43.4 to G49.

Figure 1:
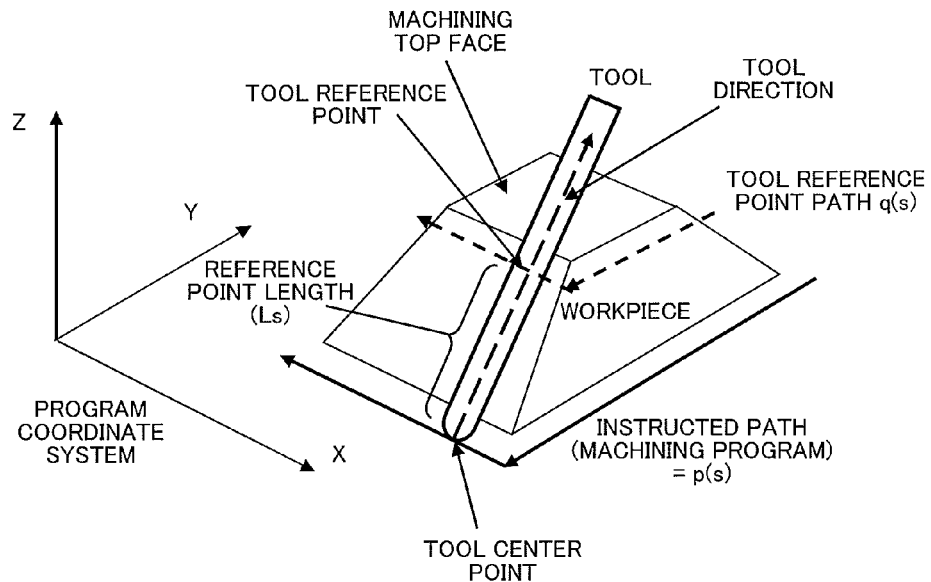
FIG. 1 is a diagram for explaining an instructed path being a relative path, with respect to a workpiece, of a tool center point that is located in a program coordinate system.

As illustrated in FIG. 1, the instructed path p that is instructed as the tool center point position on the program coordinate system is represented by a function p(s) having an instructed path cumulative length s as a parameter. Herein, p(s) is a vector in which the X, Y, Z, A and C elements on the program coordinate system are represented by cubic equations of s, as in Expression (1) below. For simplicity, p(s) has been depicted in FIG. 1 as a straight line, but in a general case, p(s) is a cubic equation represented by Expression (1). The cubic equations are generated from an instruction group X_, Y_, Z_, A_, C_ of FIG. 4. The method for generating cubic equations from the instruction group X_, Y_, Z_, A_, C_ is a conventional feature, and will not be explained in detail. In Expression (1), ax, bx, cx, dx and so forth are the respective coefficients of $s^3$, $s^2$, s and so forth. Needless to say, the instructed path can be represented by other function forms, for instance straight lines, arcs, NURBS curves or the like.

For the sake of simpler calculation notations, pa(s), pc(s) will be respectively notated hereafter as A and C in the body of the description, including mathematical expressions, and in the drawings.

$$p(s) = \begin{bmatrix} px(s) \\ py(s) \\ pz(s) \\ pa(s)(=A) \\ pc(s)(=C) \end{bmatrix} = \begin{bmatrix} ax*s^3 + bx*s^2 + cx*s + dx \\ ay*s^3 + by*s^2 + cy*s + dy \\ az*s^3 + bz*s^2 + cz*s + dz \\ aa*s^3 + ba*s^2 + ca*s + da \\ ac*s^3 + bc*s^2 + cc*s + dc \end{bmatrix} \quad (1)$$

In Japanese Patent Application Laid-Open No. 2008-225825, as explained above, a spindle path q(s) on the program coordinate system is generated using a function f, based on the instructed path (tool path) p(s), and a driving axis path r(s) is generated, using a function g, on the basis of q(s), as in Expression (2) below. In Expression (2), q(s) and r(s) are vectors having X, Y, Z, A and C elements.

$$q(s) = f(p(s)) \quad (2)$$

$$r(s) = g(q(s))$$

$$r(s) = \begin{bmatrix} rx(s) \\ ry(s) \\ rz(s) \\ ra(s) \\ rc(s) \end{bmatrix}$$

$$q(s) = \begin{bmatrix} qx(s) \\ qy(s) \\ qz(s) \\ qa(s) \\ qc(s) \end{bmatrix}$$

In the above-described Japanese Patent Application Laid-Open No. 2008-225825, machine configurational elements are not included from the instructed path p(s) up to the spindle path q(s), and machine configurational elements are introduced into the function g for generation of the driving axis path r(s), from the spindle path q(s). Hence, the two-stage division p→q→r makes it possible to standardize p→q, regardless of the machine configuration. Although p→r is also possible in two stages like the Japanese Patent Application Laid-Open No. 2008-225825, the relationship between p(s) and r(s) is important in the present invention, and hence the relationship between p(s) and r(s) is given by Expression (3) below by generating the driving axis path r(s) from a function h and p(s).

$$r(s) = h(p(s)) \quad (3)$$

In case of machine configuration of FIG. 2, the above Expression (3) is given shape to Expression (4) below. In the expression, Th is a tool length compensation vector, and L is a tool length compensation amount, such that there is a vector in the Z-axis direction alone, although the vector may be formulated as having also X, Y elements in consideration of the tool diameter and so forth. Further, Mt is a matrix that represents table rotation, and the constituent elements $RA^{-1}$, $RC^{-1}$ are matrices for reverse rotation by A about the X-axis and by C about the Z-axis.

$$r(s) = Mt * p(s) + Th \qquad (4)$$

$$r(s) = \begin{bmatrix} rx(s) \\ ry(s) \\ rz(s) \\ ra(s) \\ rc(s) \end{bmatrix}$$

$$Mt = RA^{-1} * RC^{-1}$$

$$Th = \begin{bmatrix} 0 \\ 0 \\ L \\ 0 \\ 0 \end{bmatrix}$$

$$RA^{-1} = \begin{bmatrix} 1 & 0 & 0 & 0 & 0 \\ 0 & \cos A & \sin A & 0 & 0 \\ 0 & -\sin A & \cos A & 0 & 0 \\ 0 & 0 & 0 & 1 & 0 \\ 0 & 0 & 0 & 0 & 1 \end{bmatrix}$$

$$RC^{-1} = \begin{bmatrix} \cos C & \sin C & 0 & 0 & 0 \\ -\sin C & \cos C & 0 & 0 & 0 \\ 0 & 0 & 1 & 0 & 0 \\ 0 & 0 & 0 & 1 & 0 \\ 0 & 0 & 0 & 0 & 1 \end{bmatrix}$$

The first derivative, second derivative and third derivative p", r", r'" of p(s) and r(s) with respect to s are given respectively by Expression (5), Expression (6), Expression (7), Expression (8), Expression (9) and Expression (10) below. For simplicity, the notation (s) will be omitted below when obvious. The prime symbols "'", "''" and "'''" in Mt' $(RA^{-1})$", A''' and so forth denote respectively the first derivative, second derivative and third derivative with respect to instructed path cumulative length s. The symbol "*" denotes multiplication. Also, sin AA' means (sin A)*A'. The same is true of other trigonometric functions.

$$r' = (Mt)' * p + Mt * p' \qquad (5)$$
$$= ((RA^{-1})' * RC^{-1} + RA^{-1} * (RC^{-1})') * p +$$
$$RA^{-1} * RC^{-1} * p'$$

$$(RA^{-1})' = \begin{bmatrix} 0 & 0 & 0 & 0 & 0 \\ 0 & -\sin AA' & \cos AA' & 0 & 0 \\ 0 & -\cos AA' & -\sin AA' & 0 & 0 \\ 0 & 0 & 0 & 0 & 0 \\ 0 & 0 & 0 & 0 & 0 \end{bmatrix}$$

$$(RC^{-1})' = \begin{bmatrix} -\sin CC' & \cos CC' & 0 & 0 & 0 \\ -\cos CC' & -\sin CC' & 0 & 0 & 0 \\ 0 & 0 & 0 & 0 & 0 \\ 0 & 0 & 0 & 0 & 0 \\ 0 & 0 & 0 & 0 & 0 \end{bmatrix}$$

$$p' = \begin{bmatrix} 3ax*s^2 + 2bx*s + cx \\ 3ay*s^2 + 2by*s + cy \\ 3az*s^2 + 2bz*s + cz \\ 3aa*s^2 + 2ba*s + ca \\ 3ac*s^2 + 2bc*s + cc \end{bmatrix} \qquad (6)$$

$$r'' = Mt'' * p + 2 * Mt' * p' + Mt * p'' \qquad (7)$$
$$= \{(RA^{-1})'' * RC^{-1} + 2(RA^{-1})' *$$
$$(RC^{-1})' + RA^{-1} * (RC^{-1})''\} * p +$$
$$2\{(RA^{-1})' * RC^{-1} + RA^{-1} * (RC^{-1})'\}$$
$$p' + RA^{-1} * RC^{-1} * p''$$

$$(RA^{-1})'' = \begin{bmatrix} 0 & 0 & 0 & 0 & 0 \\ 0 & -\cos AA'^2 - \sin AA'' & -\sin AA'^2 + \cos AA'' & 0 & 0 \\ 0 & \sin AA'^2 - \cos AA'' & -\cos AA'^2 - \sin AA'' & 0 & 0 \\ 0 & 0 & 0 & 0 & 0 \\ 0 & 0 & 0 & 0 & 0 \end{bmatrix}$$

$$(RC^{-1})'' = \begin{bmatrix} -\cos CC'^2 - \sin CC'' & -\sin CC'^2 + \cos CC'' & 0 & 0 & 0 \\ \sin CC'^2 - \cos CC'' & -\cos CC'^2 - \sin CC'' & 0 & 0 & 0 \\ 0 & 0 & 0 & 0 & 0 \\ 0 & 0 & 0 & 0 & 0 \\ 0 & 0 & 0 & 0 & 0 \end{bmatrix}$$

$$p'' = \begin{bmatrix} 6ax*s + 2bx \\ 6ay*s + 2by \\ 6az*s + 2bz \\ 6aa*s + 2ba \\ 6ac*s + 2bc \end{bmatrix} \qquad (8)$$

$$r''' = Mt''' * p + 3 * Mt'' * p' + 3 * Mt' * p'' + Mt * p''' \qquad (9)$$
$$= \{(RA^{-1})''' * RC^{-1} + 3(RA^{-2})'' * (RC^{-1}) +$$
$$3(RA^{-1})' * (RC^{-1})'' + RA^{-1} * (RC^{-1})'''\} * p +$$
$$\{3(RA^{-1})'' * RC^{-1} + 6 * (RA^{-1})' * (RC_{-1})' +$$
$$3(RA^{-1}) * (RC^{-1})''\} * p' +$$
$$\{3(RA^{-1})' * (RC^{-1}) + 3(RA^{-1}) * (RC^{-1})'\} * p'' +$$
$$(RA^{-1}) * (RC^{-1}) * p'''$$

-continued $$(RA^{-1})''' = \begin{bmatrix} 0 & 0 & 0 & 0 & 0 \\ \sin AA'^3 - & -\cos AA'^3 - & & & \\ 0 & 3\cos AA'A'' - & 3\sin AA'A'' + & 0 & 0 \\ \sin AA''' & \cos AA''' & & & \\ \cos AA'^3 + & \sin AA'^3 - & & & \\ 0 & 3\sin AA'A'' - & 3\cos AA'A'' - & 0 & 0 \\ \cos AA''' & \sin AA''' & & & \\ 0 & 0 & 0 & 0 & 0 \\ 0 & 0 & 0 & 0 & 0 \end{bmatrix} \quad (10)$$

$$(RC^{-1})''' = \begin{bmatrix} \sin CC'^3 - & -\cos CC'^3 - & & & \\ 3\cos CC'C'' - & 3\sin CC'C'' + & 0 & 0 & 0 \\ \sin CC''' & \cos CC''' & & & \\ \cos CC'^3 + & \sin CC'^3 - & & & \\ 3\sin CC'C'' - & 3\cos CC'C'' - & 0 & 0 & 0 \\ \cos CC''' & \sin CC''' & & & \\ 0 & 0 & 0 & 0 & 0 \\ 0 & 0 & 0 & 0 & 0 \\ 0 & 0 & 0 & 0 & 0 \end{bmatrix}$$

$$p''' = \begin{bmatrix} 6ax \\ 6ay \\ 6az \\ 6aa \\ 6ac \end{bmatrix}$$

Using the calculation results of the foregoing, Expression (11) (instructed path allowable acceleration condition) and Expression (12) (instructed path allowable jerk condition) below are computed on the basis of an instructed path allowable acceleration and an instructed path allowable jerk in the instructed path. In the expressions, pi denotes the axis elements (i=x, y, z, a, c) of p; sv denotes the first time derivative (speed) of s, sa denotes the second time derivative (acceleration) of s, and sj denotes the third time derivative (jerk) of s. Herein, Expression (11) (instructed path allowable acceleration condition) is a necessary condition. Expression (12) (instructed path allowable jerk condition) is an additional condition in cases where machining of yet higher precision and yet higher quality is required. Herein, s, sv, sa and sj are scalar magnitudes.

$$\frac{d^2 pi}{dt^2} = pi'' * \left(\frac{ds}{dt}\right)^2 + pi' * \frac{d^2 s}{dt} = pi'' * sv^2 + pi' * sa \leq Api \quad (11)$$

$$\frac{d^3 pi}{dt^3} = pi''' * \left(\frac{ds}{dt}\right)^3 + 3 * pi'' * \frac{d^2 s}{dt^2} * \frac{ds}{dt} + pi' * \frac{d^3 s}{dt^3} = \quad (12)$$
$$pi''' sv^3 + 3 * pi'' * sa * sv + pi' * sj \leq Jpi$$

Api is the allowable acceleration in each axis in the instructed path, and is referred to as instructed path allowable acceleration. Jpi is the allowable jerk of each axis in the instructed path, and is referred to as instructed path allowable jerk. These Api and Jpi are instructed path speed conditions, and are set beforehand as set values, or are instructed in the form of a program instruction. The Api and Jpi are inputted by way of an instructed path speed condition input unit. As mentioned above, Expression (11) (instructed path allowable acceleration condition) is a necessary condition, and Expression (12) (instructed path allowable jerk condition) is an additional condition that is computed when necessary. In the instructed path speed condition input unit, therefore, the instructed path allowable acceleration is necessary input data, the instructed path allowable jerk is additional input data that is inputted when necessary. Ordinarily, Api and Jpi (i=x, y, z) in X, Y and Z are identical, regardless of i. Alternatively, Api and Jpi in X, Y and Z can be computed as the resultant acceleration and the resultant jerk of X, Y and Z. The allowable acceleration and allowable jerk in the instructed path that is the relative path of the tool center point with respect to the workpiece are based on machining conditions (target machining precision, tool that is used, workpiece material and so forth). Therefore, the allowable acceleration and allowable jerk may be instructed or set for each machining run. The same applies to a tool reference point path allowable speed, allowable acceleration and allowable jerk that are described below.

Expression (13), Expression (14) and Expression (15) below are obtained on the basis of the foregoing (Expression (11) and Expression (12)) and a condition whereby sv does not exceed the instructed path speed (instruction F). The instructed path speed is the instruction F that is instructed as a speed instruction in the program. Herein, sv is prescribed not to exceed the instructed path speed (instruction F), but as in the case of Api and Jpi, the allowable speed for each axis in the instructed path, i.e. Vpi, may be set beforehand and sv may be set so as not to exceed the smaller one from among Vpi or the instructed path speed (instruction F) in Expression (13).

$$sv \leq \text{instruction } F \quad (13)$$

$$sa \leq \frac{Api - pi'' * sv^2}{pi'} \quad (14)$$

$$sj \leq \frac{Jpi - pi''' * sv^3 - 3 * pi'' * sa^2 * sv}{pi'} \quad (15)$$

The largest sv that satisfies the foregoing expressions on the instructed path and the largest sa, sj that satisfy the foregoing expressions for each axis in the instructed path are an allowable speed svp, an allowable acceleration sap and an allowable jerk sjp of s according to an instructed path speed condition. As mentioned above, Expression (11) (instructed path allowable acceleration condition) is a necessary condition, and Expression (12) (instructed path allowable jerk condition) is an additional condition. Therefore, although Expression (13) and Expression (14) are derived necessarily, Expression (15) is not derived in a case where only the instructed path allowable acceleration is inputted and the instructed path allowable jerk is not inputted in the instructed path speed condition input unit. In this case, sjp has no condition, and may take on any large value (positive value) or small value (negative value).

Likewise, Expression (16) (driving axis allowable speed condition), Expression (17) (driving axis allowable acceleration condition) and Expression (18) (driving axis allowable jerk condition) below are computed on the basis of a driving axis allowable speed, a driving axis allowable acceleration, and a driving axis allowable jerk for the driving axes. Herein, ri are axis elements (i=x, y, z, a, c) of r. As already explained, sv denotes the first time derivative (speed) of s, sa denotes the second time derivative (acceleration) of s, and sj denotes the third time derivative (jerk) of s.

$$\frac{dri}{dt} = ri' * \frac{ds}{dt} = ri' * sv \leq Vri \tag{16}$$

$$\frac{d^2ri}{dt^2} = ri'' * \left(\frac{ds}{dt}\right)^2 + ri' * \frac{d^2s}{dt^2} = ri'' * sv^2 + ri' * sa \leq Ari \tag{17}$$

$$\frac{d^3ri}{dt^3} = ri''' * \left(\frac{ds}{dt}\right)^3 + 3 * ri'' * \frac{d^2s}{dt^2} * \frac{ds}{dt} + ri' * \frac{d^3s}{dt^3} = \tag{18}$$
$$ri''' * sv^3 + 3 * ri'' * sa * sv + ri' * sj \leq Jri$$

In the expressions, Vri, Ari and Jri are the driving axis allowable speed, driving axis allowable acceleration and driving axis allowable jerk (i=x, y, z, a, c) of each driving axis (X-axis, Y-axis, Z-axis, A-axis and C-axis). Herein, Vri, Ari and Jri are driving axis speed conditions, and are set beforehand as set values, or are instructed in the form of a program instruction. These Vri, Ari and Jri are inputted through a driving axis speed condition input unit. As described above, Expression (16) (driving axis allowable speed condition) and Expression (17) (driving axis allowable acceleration condition) are necessary conditions, and Expression (18) (driving axis allowable jerk condition) is an additional condition that is computed when necessary. Therefore, also in the driving axis speed condition input unit, the driving axis allowable speed and the driving axis allowable acceleration are necessary input data, and the driving axis allowable jerk is additional input data to be inputted when necessary. Inputting these driving axis speed conditions and computing Expression (16), Expression (17) and Expression (18) corresponding thereto are conventional features. Expression (19), Expression (20), Expression (21) below are obtained from the foregoing.

$$sv \leq \frac{Vri}{ri'} \tag{19}$$

$$sa \leq \frac{Ari - ri'' * sv^2}{ri'} \tag{20}$$

$$sj \leq \frac{Jri - ri''' * sv^3 - 3 * ri'' sa^2 * sv}{ri'} \tag{21}$$

The largest sv, sa and sj that satisfy the foregoing expressions for each driving axis are an allowable speed svr, an allowable acceleration sar and an allowable jerk sjr of s according to a driving axis speed condition. As described above, Expression (16) (driving axis allowable speed condition) and Expression (17) (driving axis allowable acceleration condition) are necessary conditions, and Expression (18) (driving axis allowable jerk condition) is an additional condition. Therefore, although Expression (19) and Expression (20) are derived necessarily, Expression (21) is not derived in a case where only the Vri driving axis allowable speed and the Ari driving axis allowable acceleration are inputted, and the Jri driving axis allowable jerk is not inputted, in the driving axis speed condition input unit. In this case, sjr has no condition, and may take on any large value (positive value) or small value (negative value).

By virtue of Expression (13), the allowable speed svp of s is worked out, to yield an instructed path interval allowable speed, for each division interval resulting from dividing the instructed path into a plurality of intervals according to the instructed path cumulative length s, as illustrated in FIG. 5. Likewise, the allowable speed svr of s for each division interval is worked out based on the basis of Expression (19), to yield a driving axis interval allowable speed. Herein, the intervals can be set according to various methods in which, for instance, every given distance is set as an interval, or an instruction block unit in the machining program is set as an interval, or there is set an interval of a length that is inversely proportional to curvature such that a short-distance interval is set in a large-curvature site. In each interval, p(s) is represented by a given function, such as the one in Expression (1) above. (Although Expression (1) is a cubic equation, the function may take on another function form, as already explained for Expression (1)). Since svp and svr are derived from Expression (13) and Expression (19), svp and svr are values that are represented by svp(s), svr(s) that vary with s within each division interval. For simplicity in the calculations hereafter, however, svp and svr will be regarded as constant within each division interval. That is, taking ss and se as the start point and end point of s, respectively, in a given division interval, then svp and svr are the smaller values from among svp(ss) and svp(se), and the smaller value of svr(ss) and svr(se), at the origin or the end point, as given by Expression (22). Alternatively, svp and svr are set as constants according to a method wherein svp and svr are set as the values of svp(s), svp(s) and svr(s), svr(s) at a midpoint between the origin and the end point, as given by Expression (23). Also, svp and svr can be set to values of svp(s), svr(s) at appropriate representative points between ss and se. Of course, svp and svr may be set not as constant within each division interval, but as variable with s, as in svp(s) and svr(s). The same is true of sap, sar, sjp, sjr and the below-described (second embodiment) svqs, saqs and sjqs.

$$svp = \text{Min}\{svp(ss), svp(se)\}$$

$$svr = \text{Min}\{svr(ss), svr(se)\} \tag{22}$$

$$svp = svp\left(\frac{ss + se}{2}\right) \tag{23}$$
$$svr = svr\left(\frac{ss + se}{2}\right)$$

In FIG. 5, the dashed line denotes the instructed path interval allowable speed svp and the solid line denotes the driving axis interval allowable speed svr for each division interval. The smaller value from among the foregoing is a speed clamp value svc. That is, svc=Min(svp, svr). In FIG. 5, svp is depicted as different at each division interval, assuming an instance wherein the instruction F is modified and instructed for each division interval.

Figure 6:
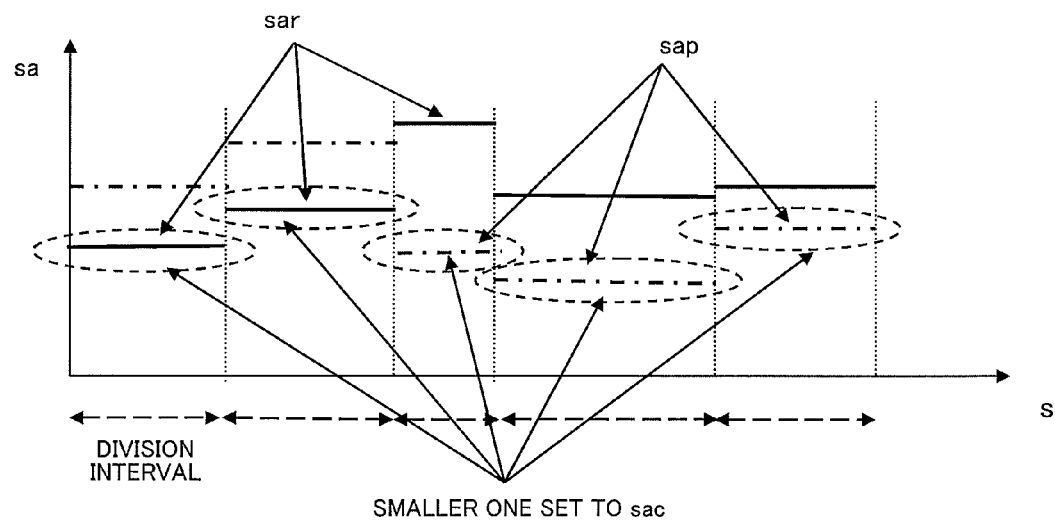
FIG. 6 is a diagram for explaining the feature of working out allowable accelerations sap and sar for each division interval resulting from dividing an instructed path cumulative length s into intervals, setting sap and sar to an instructed path interval allowable acceleration and a driving axis interval allowable acceleration, respectively, and setting the smaller value from among sap and sar to an acceleration clamp value sac.

Likewise, the allowable speed sap and allowable acceleration sar of s are worked out for each division resulting from dividing the instructed path cumulative length into intervals, as illustrated in FIG. 6, according to Expression (14) and Expression (20), to yield an instructed path interval allowable acceleration and a driving axis interval allowable acceleration, respectively. The smaller value from among the foregoing is set to an acceleration clamp value sac. That is, sac=Min (sap, sar). In FIG. 6, the dashed line denotes the instructed path interval allowable acceleration sap for each division interval, and the solid line denotes the driving axis interval allowable acceleration sar. The smaller value from among the foregoing is set to the acceleration clamp value sac.

Figure 7:
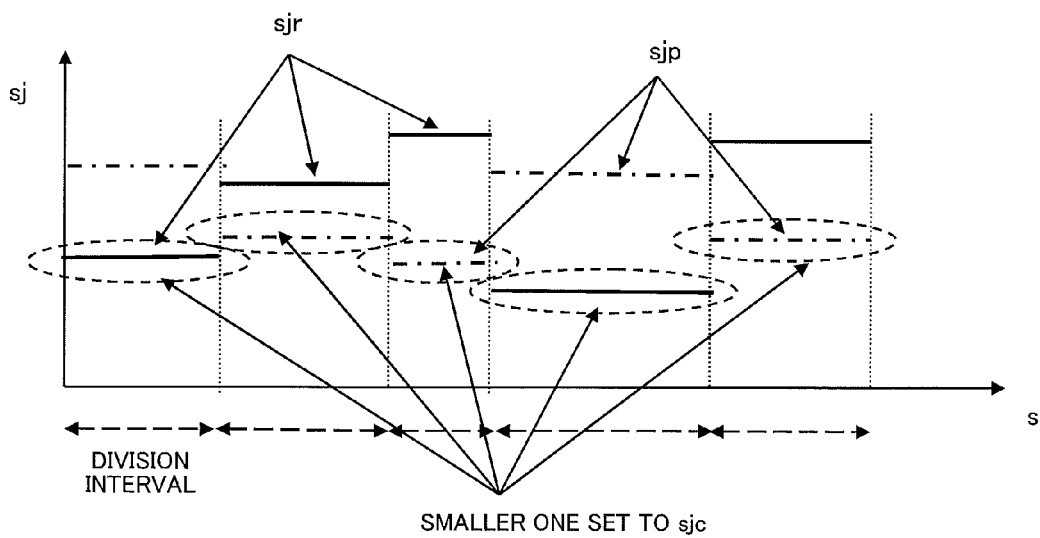
FIG. 7 is a diagram for explaining the features of working out allowable jerks sjp and sjr for each division interval resulting from dividing an instructed path cumulative length s into intervals, setting sjp and sjr to an instructed path interval allowable jerk and a driving axis interval allowable jerk, respectively, and setting the smaller value from among sjp and sjr to a jerk clamp value sjc.

Likewise, in a case where Expression (15) and Expression (21) are derived by the additional conditions, sjp and sjr are worked out for each division resulting from dividing s into intervals, as illustrated in FIG. 7, according to Expression (15) and Expression (21), to yield an instructed path interval allowable jerk and a driving axis interval allowable jerk, respectively. The smaller of the foregoing is set to a jerk clamp value sjc. That is, sjc=Min(sjp, sjr). In FIG. 7, the dashed line denotes sjp for each division interval, the solid line denotes sjr, and the smaller of the foregoing is set to the jerk clamp value sjc.

A speed curve svl that yields the largest speed that satisfies the svc and sac worked out for each interval is generated on the basis of svc and sac. In a case where, for instance, svc and sac are worked out, like the broken line of FIG. 8, the speed curve svl can be worked out in the form of the solid line in FIG. 8 (top diagram) as the largest speed that satisfies svc and sac. The speed curve svl is generated by generating sal for sa (acceleration), from the local minimum region of svc towards the right and the left, while the sal is made a maximum value within sac, and by integrating then sal with respect to time.

Figure 8:
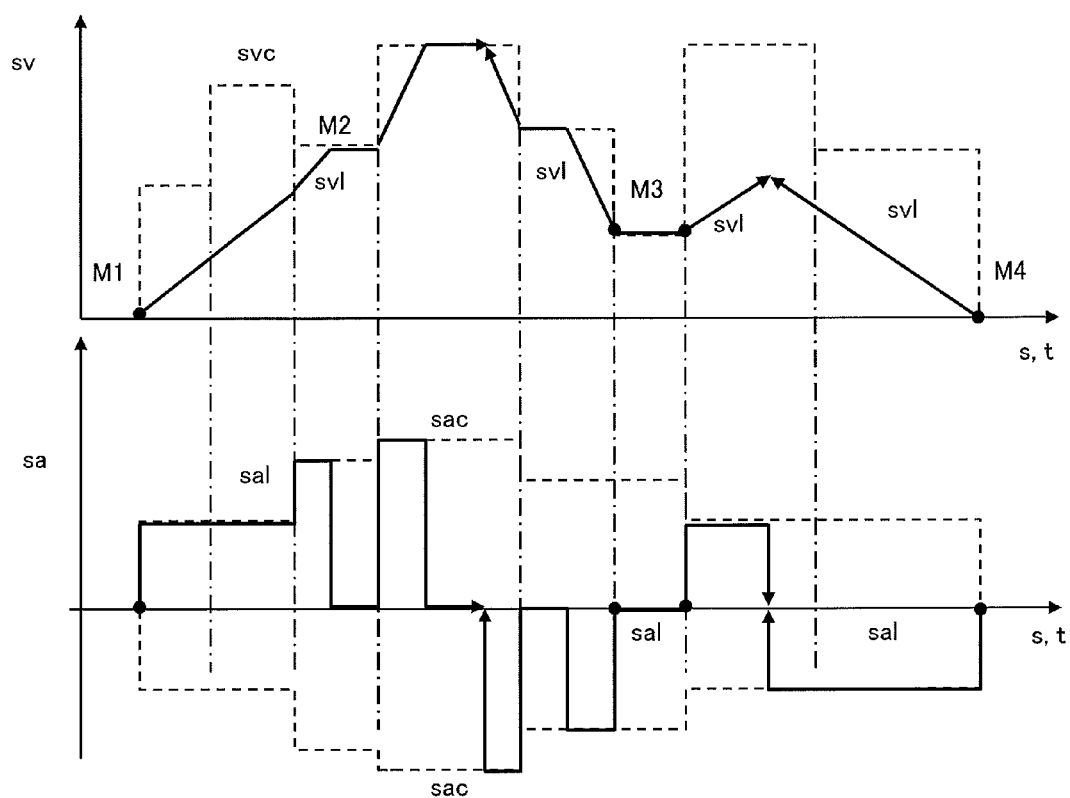
FIG. 8 is a diagram for explaining the generation of a speed curve svl, on the basis of a speed clamp value svc and acceleration clamp value sac determined for each division interval, such that the speed curve svl yields the largest speed that satisfies the speed clamp value svc and the acceleration clamp value sac.

When svl reaches svc, there is set sal=0 and svl=svc. Thus, svl from the right and the left of a local minimum region reach a site at which svl takes on a same svl value for a same s, and the speed curve svl is generated as a result. The local minimum regions such as M1, M2, M3 and M4 in FIG. 8 are regions at which svc increases towards the left and right from the region, and include the origin and the end point of the instructed path. Although svc is only positive, sac is effective both for acceleration and deceleration, and hence the acceleration clamp value that is worked out as described above as an absolute value is negative and positive like FIG. 8 (lower diagram).

In FIG. 8, specifically, sal is generated while taking a positive sac, as sa, to the right from the local minimum region M1 at the origin, and sal is integrated with respect to time to generate svl. When svl reaches svc, there are set sal=0 and svl=svc. Likewise, sal is generated while taking a negative sac, as sa, to the left from the local minimum region M3, and sal is integrated with respect to time to generate svl. When svl reaches svc, there are set sal=0 and svl=svc.

Also, svl from M1 to M3 is generated when the value of svl generated from the local minimum region M1 to the right and the value of svl generated from the local minimum region M3 to the left take on a same value s. At this time, svl generated from the local minimum region M2 to the left is equal to or greater than the svl generated from the local minimum region M1. Accordingly, since svl that is generated from the local minimum region M2 is included in the svl that is generated from the local minimum region M1, it is not used. Likewise, svl is generated from the local minimum region M3 to the right, and from the end point M4 to the left. At the local minimum region M3, there holds svl=svc. The svl generated from M1 to M3 to M4 is the speed curve svl that is worked out. In FIG. 8 (likewise in FIG. 9 described below), s and t stand in a one-to-one correspondence to each other, and hence share the same abscissa axis, for convenience. However, the scale of s and the scale of t are dissimilar in fact.

In a case where sjc is worked out according to an additional condition, then a speed curve svl is generated that yields the largest speed that satisfies svc, sac and sjc, on the basis of the svc, sac and sjc of each division interval. As in the case of sac which is found on the positive and negative side, as an absolute value, the jerk clamp value worked out for sjc is found as well on the positive and negative side, as an absolute value like FIG. 9 (lower diagram).

Figure 9:
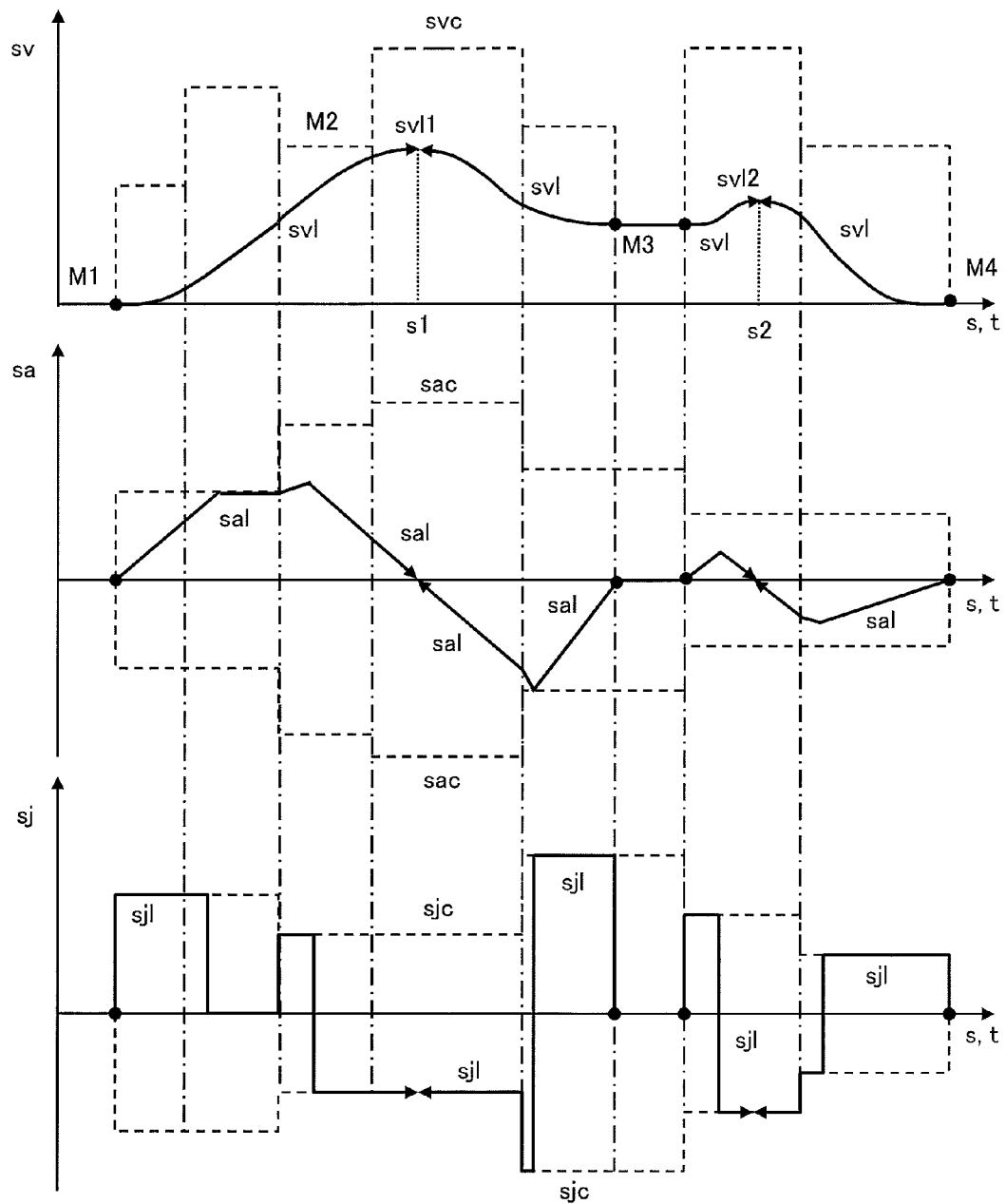
FIG. 9 is a diagram for explaining the generation of a speed curve svl, on the basis of a speed clamp value svc, an acceleration clamp value sac, and a jerk clamp value sjc, in a case where a jerk clamp value sjc is worked out according to an additional condition, such that the speed curve svl yields the largest speed that satisfies the speed clamp value svc, the acceleration clamp value sac and the jerk clamp value sjc.

In a case where, for instance, svc, sac and sjc are worked out, like the broken line of FIG. 9, a speed curve svl can be worked out in the form of the solid line in FIG. 9 (topmost diagram) as the largest speed that satisfies svc, sac and sjc. The curve sal is generated by generating sjl for sj (jerk), from the local minimum region of svc towards the right and the left, while the sjl is made a maximum value within sjc, and by integrating then sjl with respect to time.

When sal reaches sac, there are set sal=sac and sjl=0. Further, svl is generated through time integration of sal. When svl reaches svc, there are set svl=svc, sal=0 and sjl=0. If svl from the right of a local minimum region and also svl from the left of the local minimum region are obtained as the same value svl1 at s=s1, as from M1 and from M3 in FIG. 9, then the speed curve svl is generated between M1 and M3. Likewise, If svl from the right of a local minimum region and also svl from the left of the local minimum region are obtained as the same value svl2 at s=s2, as from M3 and from M4 in FIG. 9, then the speed curve svl is generated between M3 and M4. Herein, s1 (s2) and svl1 (svl2) are obtained by numerical calculation, for instance in accordance with a bisection method. The specific method is a conventional one, disclosed in US Patent Application Publication No. 2009/0295323 above, and will not be explained in detail here. The purpose of the method in US Patent Application Publication No. 2009/0295323 is to work out the jerk (path jolt r(s)), whereas the object of the present invention is to work out a speed curve to perform interpolation.

Speed for an instructed path cumulative length (movement distance along the instructed path p) s is worked out on the basis of the speed curve svl that is worked out as described above. Interpolation of instructed path p is performed then on the basis of that speed, to work out an instructed path interpolation position. A driving axis movement amount is worked out through conversion of the instructed path interpolation position to a driving axis position. That is, a speed sv0 is worked out based on the svl that corresponds to a position s=s0 as worked out in a previous interpolation period, and s1=s0+sv0*Δt is set to the position of s at the current interpolation period, where Δt is an interpolation period time. And p(s1) is an instructed path interpolation position in the current interpolation period. Further, r(s)=h(p(s1)) given by Expression (3) is a driving axis position for the instructed path interpolation position. The above computation is carried out in an interpolation unit. The computation in the interpolation unit is a conventional feature, and will not be explained in detail.

Second Embodiment

If the workpiece is machined by the side face of the tool, as already explained, some instances require speed control by acceleration or jerk of the tool center point, and also speed control by allowable speed, allowable acceleration and allowable jerk in a tool reference point path being a relative path of the tool reference point with respect to the workpiece, wherein the above tool reference point is set to a specific position on the tool that is different from the tool center point (for instance, a position on the tool corresponding to the machining top face) (FIG. 1, FIG. 2). That is, the speed is instructed in the instructed path by the instruction F. Therefore, the travel speed of the tool center point in the instructed path is not greater than the instructed value F thereof. Therefore, the allowable speed for the instructed path (Vpi described above) is ordinarily unnecessary. In some instances, however, in the path of the tool reference point, the speed may be larger than the instructed speed of the F instruction at the tool center point, and hence speed control based on the tool reference point path allowable speed becomes necessary.

As the characterizing feature of the second embodiment, accordingly, a point on the tool spaced apart from the tool center point position by a reference length (Ls) is set as a tool reference point, and speed control is further performed at the tool reference point, as compared with the first embodiment described above.

For the instructed path p(s) that is instructed as the tool center point position on the program coordinate system, a tool reference point path qs(s) that is the path of the tool reference point is given by Expression (24) below. In Expression (24), a vector Ts of the reference length Ls is multiplied by a matrix Mh that represents the rotation of a tilt component by the A-axis and the C-axis, which are rotation axes, and p(s) is added to the multiplication result, to yield a tool reference point path qs(s) (see FIG. 1).

$$qs(s) = p(s) + Mh * Ts \qquad (24)$$

$$qs(s) = \begin{bmatrix} qsx(s) \\ qsy(s) \\ qsz(s) \\ qsa(s) \\ qsc(s) \end{bmatrix}$$

$$Mh = RC * RA$$

$$Ts = \begin{bmatrix} 0 \\ 0 \\ Ls \\ 0 \\ 0 \end{bmatrix}$$

$$RA = \begin{bmatrix} 1 & 0 & 0 & 0 & 0 \\ 0 & \cos A & -\sin A & 0 & 0 \\ 0 & \sin A & \cos A & 0 & 0 \\ 0 & 0 & 0 & 1 & 0 \\ 0 & 0 & 0 & 0 & 1 \end{bmatrix}$$

$$RC = \begin{bmatrix} \cos C & -\sin C & 0 & 0 & 0 \\ \sin C & \cos C & 0 & 0 & 0 \\ 0 & 0 & 1 & 0 & 0 \\ 0 & 0 & 0 & 1 & 0 \\ 0 & 0 & 0 & 0 & 1 \end{bmatrix}$$

The first derivative, second derivative and third derivative qs', qs'', qs''' of qs(s) with respect to s can be worked out by performing the same calculation as in the first embodiment but using Expression (24) instead of Expression (4). As in the case of the above-described Expression (16), Expression (17) and Expression (18), herein Expression (25) (tool reference point path allowable speed condition), Expression (26) (tool reference point path allowable acceleration condition) and Expression (27) (tool reference point path allowable jerk condition) are computed on the basis of the tool reference point path allowable speed, a tool reference point path allowable acceleration and a tool reference point path allowable jerk of the tool reference point path. In the expressions, qsi are axis elements (i=x, y, z, a, c) of qs, and as described above, sv is the first time derivative (speed) of s, sa is the second time derivative (acceleration) of s, and sj is the third time derivative (jerk) of s.

$$\frac{dqsi}{dt} = qsi' * \frac{ds}{dt} = qsi' * sv \le Vqsi \qquad (25)$$

$$\frac{d^2 qsi}{dt^2} = qsi'' * \left(\frac{ds}{dt}\right)^2 + qsi' * \frac{d^2 s}{dt^2} = qsi'' * sv^2 + qsi' * sa \le Aqsi \qquad (26)$$

$$\frac{d^3 qsi}{dt^3} = qsi''' * \left(\frac{ds}{dt}\right)^3 + 3 * qsi'' * \frac{d^2 s}{dt^2} * \frac{ds}{dt} + qsi' * \frac{d^3 s}{dt^3} = \qquad (27)$$
$$qsi''' * sv^3 + 3 * qsi'' * sa * sv + qsi' * sj \le Jqsi$$

In the expressions, Vqsi, Aqsi and Jqsi are the tool reference point path allowable speed, tool reference point path allowable acceleration and tool reference point path allowable jerk (i=x, y, z, a, c) of each axis (X, Y and Z, A-axis and C-axis) in each tool reference point path. Also, Vqsi, Aqsi and Jqsi are tool reference point path speed conditions, and are set beforehand as set values (default values), or are instructed in the form of a program instruction. Herein, Vqsi, Aqsi and Jqsi are inputted by way of a tool reference point path speed condition input unit. As in the case of the instructed path speed conditions, Expression (25) (tool reference point path allowable speed condition) and Expression (26) (tool reference point path allowable acceleration condition) are necessary conditions, and Expression (27) (tool reference point path allowable jerk condition) is an additional condition that is computed when necessary. In the tool reference point path speed condition input unit, therefore, the tool reference point path allowable speed and the tool reference point path allowable acceleration are necessary input data, and the tool reference point path allowable jerk is additional input data to be inputted when necessary. Ordinarily, Vqsi, Aqsi and Jqsi (i=x, y, z) in the X-axis, Y-axis and Z-axis are identical, or, alternatively, Vqsi, Aqsi and Jqsi in the X-axis, Y-axis and Z-axis can be calculated as the resultant speed, resultant acceleration and resultant jerk in the X-axis, Y-axis and Z-axis.

Expression (28), Expression (29) and Expression (30) below are obtained from the foregoing.

$$sv \le \frac{Vqsi}{qsi'} \qquad (28)$$

$$sa \le \frac{Aqsi - qsi'' * sv^2}{qsi'} \qquad (29)$$

$$sj \le \frac{Jqsi - qsi''' * sv^3 - 3 * qs'' sa^2 * sv}{qsi'} \qquad (30)$$

The largest sv, sa, sj that satisfy the foregoing expressions for each axis are the allowable speed svqs, the allowable acceleration sags and allowable jerk sjqs of s according to the tool reference point path speed condition. As mentioned above, Expression (25) (tool reference point path allowable speed condition) and Expression (26) (tool reference point path allowable acceleration condition) are necessary conditions, and Expression (27) (instructed path allowable jerk condition) is an additional condition. Therefore, although Expression (28) and Expression (29) are derived necessarily, Expression (27) and Expression (30) are not derived in a case where only the tool reference point path allowable speed Vqsi and the tool reference point path allowable acceleration Aqsi are inputted, and the tool reference point path allowable jerk Jqsi is not inputted, in the tool reference point path speed condition input unit. In this case, sjqs has no condition, and may take on any large value (positive value) or small value (negative value).

In the first embodiment, the instructed path interval allowable speed svp and the driving axis interval allowable speed svr are worked out for each division interval resulting from dividing s into intervals, such that the smaller value from among the foregoing is the speed clamp value svc. In the present embodiment, additionally, the tool reference point path interval allowable speed svqs as well is worked out for each division interval, and the smallest value from among svp, svr and svqs is set to the speed clamp value svc. That is, svc=Min(svp, svr, svqs). In the first embodiment described above, the instructed path interval allowable acceleration sap and the driving axis interval allowable acceleration sar are worked out for each division interval, and the smaller value from among the foregoing is set to the acceleration clamp value sac. In the present embodiment, additionally, a tool reference point path interval allowable acceleration saqs is worked out for each division interval, and the smallest value from among sap, sar and saqs is set to the acceleration clamp value sac. That is, sac=Min(sap, sar, saqs). Similarly, in the first embodiment described above, the instructed path interval allowable jerk sjp and the driving axis interval allowable jerk sjr are worked out for each division interval, and the smaller of the foregoing is set to the jerk clamp value sjc. In the present embodiment, additionally, the tool reference point path interval allowable jerk sjqs is worked out for each division interval, and the smallest value from among sjp, sjr and sjqs is set to the jerk clamp value sjc. That is, sjc=Min(sjp, sjr, sjqs). The process thereafter is identical to that of the first embodiment, and will not be explained again.

Third Embodiment

Figure 10:
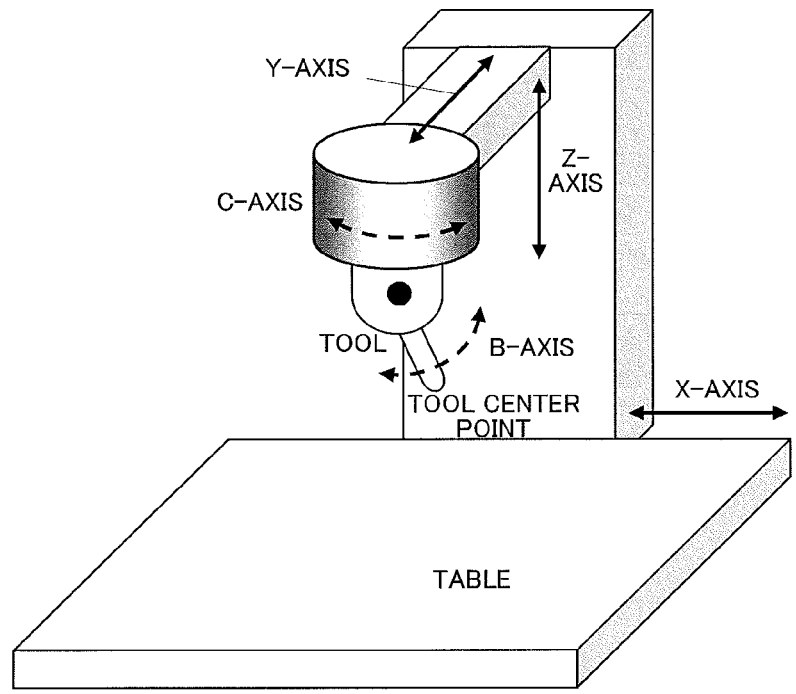
FIG. 10 is a diagram for explaining a tool head rotation-type five-axis machine tool having three linear axes and two rotation axes about which a tool head rotates.

In the first and the second embodiments described above, the multi-axis machine tool controlled by the numerical controller according to the present invention is a table rotation-type five-axis machine tool, and in a third embodiment, is a tool head rotation-type five-axis machine tool, such as the one illustrated in FIG. 10, having three linear axes and two rotation axes about which a tool head rotates.

In this case, the relationship between p(s) and r(s) is given by Expression (31) below, instead of Expression (4) in the first embodiment described above. In Expression (31), Mh is a matrix that represents tool head rotation. The constituent elements RB, RC are matrices for rotation by B about the Y-axis and by C about the Z-axis.

$$r(s) = p(s) + Mh * Th \qquad (31)$$

$$r(s) = \begin{bmatrix} rx(s) \\ ry(s) \\ rz(s) \\ ra(s) \\ rc(s) \end{bmatrix}$$

$$p(s) = \begin{bmatrix} px(s) \\ py(s) \\ pz(s) \\ pb(s)(=B) \\ pc(s)(=C) \end{bmatrix}$$

$$Mh = RC * RB$$

$$Th = \begin{bmatrix} 0 \\ 0 \\ L \\ 0 \\ 0 \end{bmatrix}$$

$$RB = \begin{bmatrix} 1 & 0 & 0 & 0 & 0 \\ 0 & \cos B & -\sin B & 0 & 0 \\ 0 & \sin B & \cos B & 0 & 0 \\ 0 & 0 & 0 & 1 & 0 \\ 0 & 0 & 0 & 0 & 1 \end{bmatrix}$$

$$RC = \begin{bmatrix} \cos C & -\sin C & 0 & 0 & 0 \\ \sin C & \cos C & 0 & 0 & 0 \\ 0 & 0 & 1 & 0 & 0 \\ 0 & 0 & 0 & 1 & 0 \\ 0 & 0 & 0 & 0 & 1 \end{bmatrix}$$

Otherwise, the third embodiment is identical to the first embodiment and the second embodiment, and hence a further explanation will be omitted.

Fourth Embodiment

Figure 11:
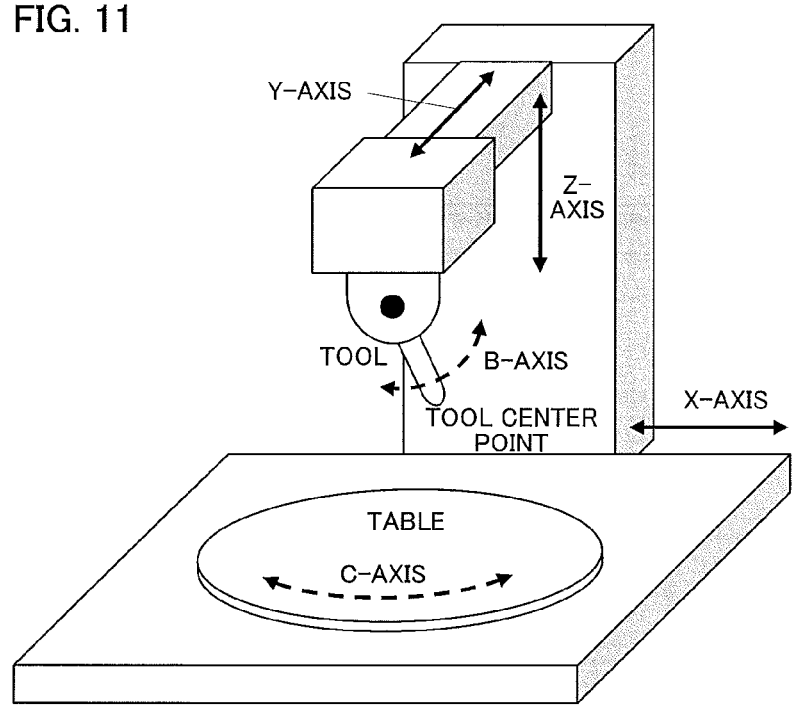
FIG. 11 is a diagram for explaining a mixed five-axis machine tool having three linear axes, one rotation axis about which a tool head rotates, and one rotation axis about which a table rotates.

In a fourth embodiment, the multi-axis machine tool that is controlled by the numerical controller according to the present invention is a mixed five-axis machine tool having three linear axes, one rotation axis about which a tool head rotates, and one rotation axis about which a table rotates as shown in FIG. 11. In this case, a calculation is performed identical to that of Expression (31), for the tool head, and identical to that of Expression (4), for the rotation table. In the present embodiment, the relationship between p(s) and r(s) is given by Expression (32) below, instead of Expression (4) in the first embodiment described above. Otherwise, the embodiment is identical to the first embodiment and the second embodiment, and hence a further explanation will be omitted.

$$r(s) = RC^{-1} * p(s) + RB * Th \qquad (32)$$

$$r(s) = \begin{bmatrix} rx(s) \\ ry(s) \\ rz(s) \\ ra(s) \\ rc(s) \end{bmatrix}$$

$$p(s) = \begin{bmatrix} px(s) \\ py(s) \\ pz(s) \\ pb(s)(=B) \\ pc(s)(=C) \end{bmatrix}$$

$$Th = \begin{bmatrix} 0 \\ 0 \\ L \\ 0 \\ 0 \end{bmatrix}$$

$$RB = \begin{bmatrix} 1 & 0 & 0 & 0 & 0 \\ 0 & \cos B & -\sin B & 0 & 0 \\ 0 & \sin B & \cos B & 0 & 0 \\ 0 & 0 & 0 & 1 & 0 \\ 0 & 0 & 0 & 0 & 1 \end{bmatrix}$$

$$RC^{-1} = \begin{bmatrix} \cos C & \sin C & 0 & 0 & 0 \\ -\sin C & \cos C & 0 & 0 & 0 \\ 0 & 0 & 1 & 0 & 0 \\ 0 & 0 & 0 & 1 & 0 \\ 0 & 0 & 0 & 0 & 1 \end{bmatrix}$$

In the first to fourth embodiments described above, examples have been illustrated in which the present invention is used in a five-axis machine tool having two rotation axes, but if one rotation axis from among the two rotation axes is rendered unnecessary by making the position of the axis a fixed position, the multi-axis machine tool that is controlled by the numerical controller according to the present invention can be used then as a four-axis machine tool having one rotation axis.

Block Diagram

Figure 12:
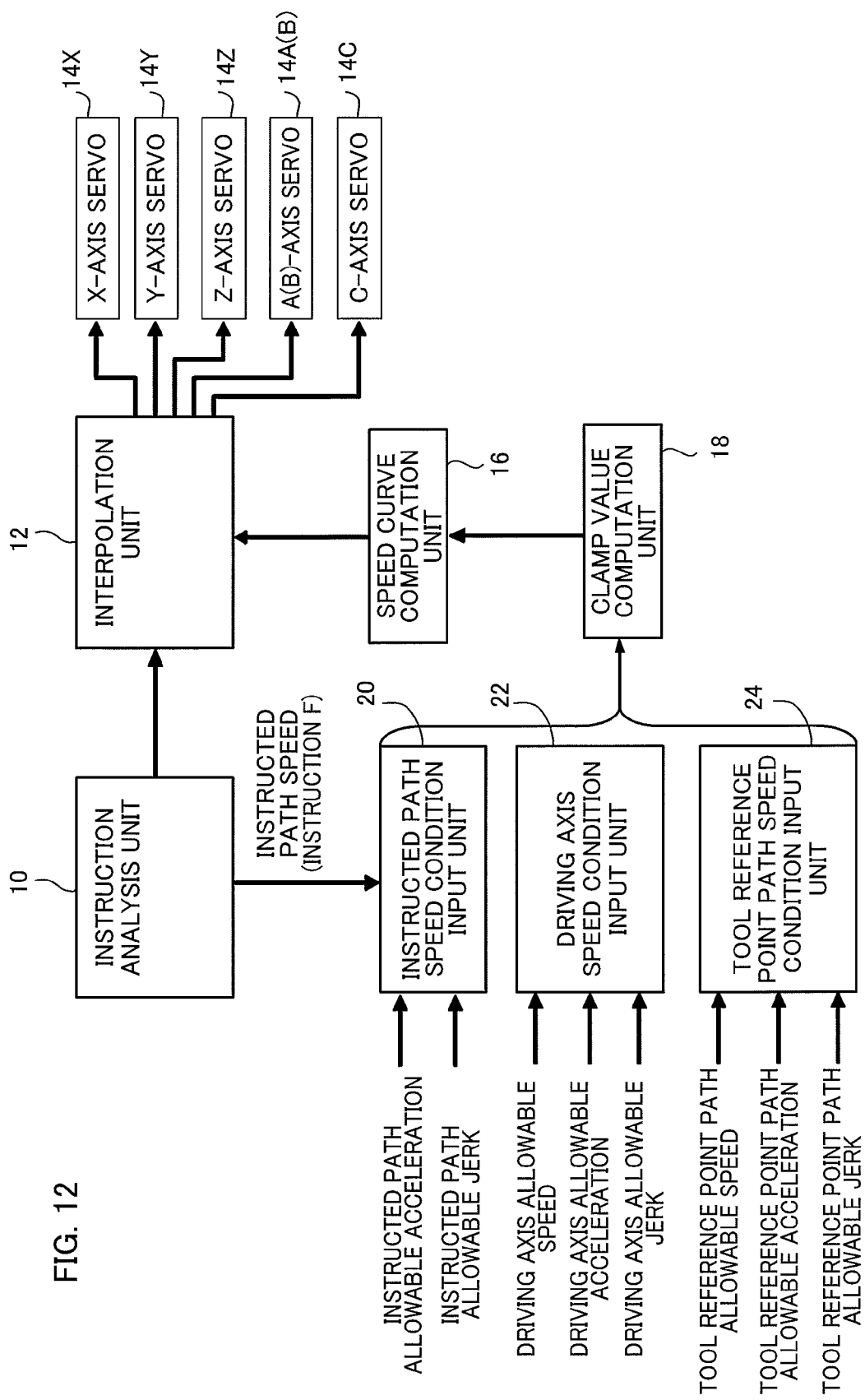
FIG. 12 is a block diagram for explaining a numerical controller that performs speed control based on an instructed path speed condition, according to the present invention.

Next, the first and the second embodiments of the numerical controller according to the present embodiment are explained with reference to FIG. 12.

In the numerical controller, ordinarily, interpolation data is generated through analysis of the machining program in an instruction analysis unit 10; the positions to which the tool is to move in each axis is worked out through interpolation on the basis of the interpolation data, in an interpolation unit 12; and servos (14X, 14Y, 14Z, 14A(B), 14C) in each axis are driven based on these positions.

In the numerical controller according to the present invention, the instructed path speed (instruction F), the instructed path allowable acceleration and the instructed path allowable jerk are inputted by an instructed path speed condition input unit 20; the driving axis allowable speed, the driving axis allowable acceleration and the driving axis allowable jerk are inputted by a driving axis speed condition input unit 22; and the tool reference point path allowable speed, the tool reference point path allowable acceleration and the tool reference point path allowable jerk are inputted by a tool reference point path speed condition input unit 24. The speed clamp value, the acceleration clamp value and the jerk clamp value are computed, on the basis of the above speed conditions, for each division interval, by a clamp value computation unit 18. The speed curve as the largest speed that does not exceed the speed clamp value, the acceleration clamp value or the jerk clamp value, is computed by a speed curve computation unit 16. The interpolation unit 12 performs interpolation according to speed based on the speed curve, computes a driving axis movement amount through conversion of an interpolated instructed path interpolation position to a driving axis position, and drives each axis servo (14X, 14Y, 14Z, 14A(B), 14C) in accordance with the driving axis movement amount. Interpolation and conversion in the interpolation unit 12 are conventional interpolation and conversion.

The tool reference point path speed condition input unit 24 can be omitted in an embodiment where the workpiece is not machined by the tool side face.

Figure 13:
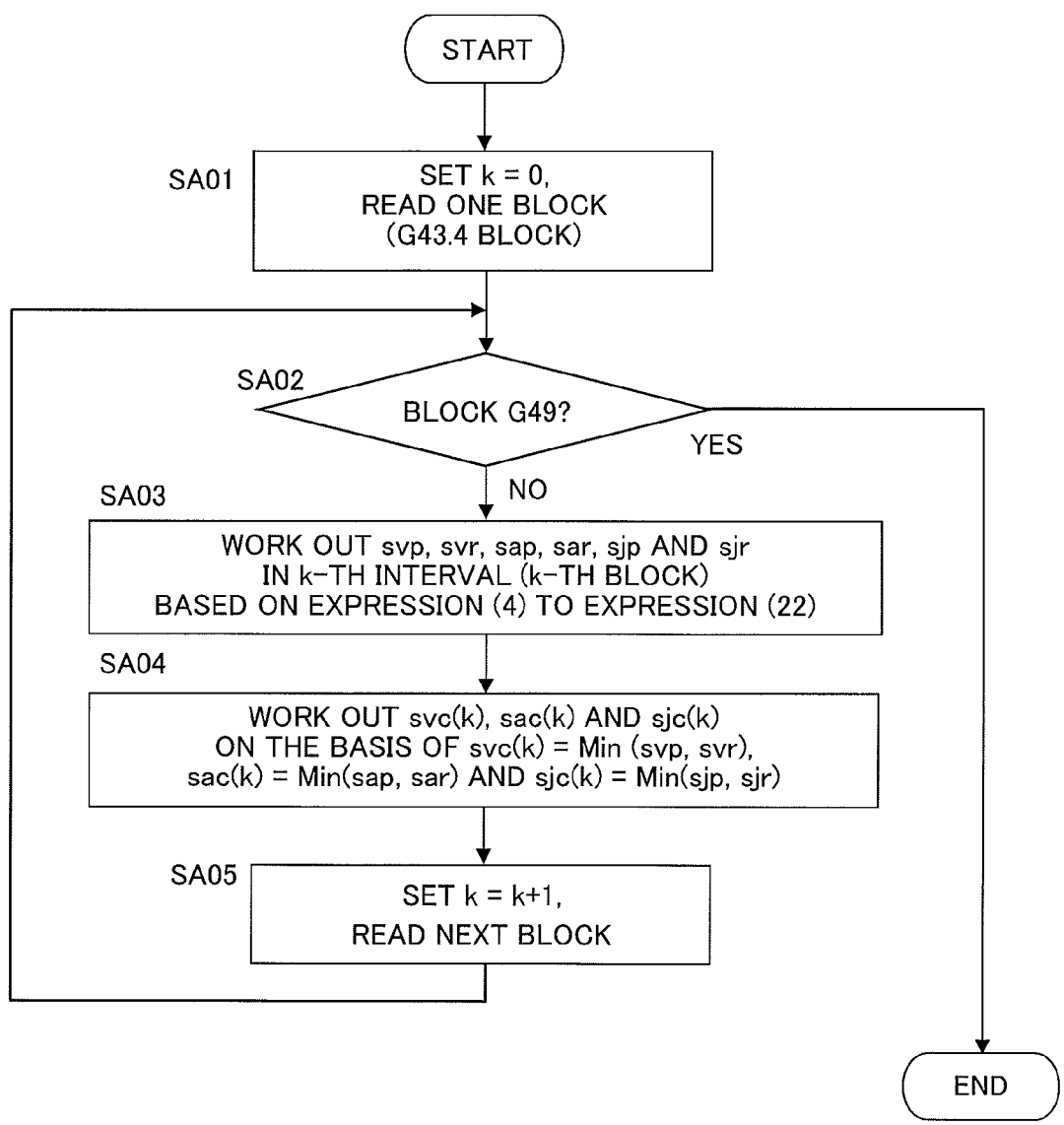
FIG. 13 is a flowchart illustrating a process in a clamp value computation unit in a first embodiment of the numerical controller according to the present invention.

FIG. 13 is a flowchart illustrating a process in a clamp value computation unit in a first embodiment of the numerical controller according to the present invention.

The process starts in block G43.4 of FIG. 4 and ends in block G49. Herein, the division intervals are instruction block units. The number of the division interval is notated as k, and svc, sac and sjc of each division interval are represented with k as the index of svc, sac and sjc in each division interval. The various steps are explained next.

[Step SA01] There is set k=0, and one block (block G43.4) is read.

[Step SA02] It is determined whether or not the read block is block G49. If the read block is block G49 (determination: YES), the process is terminated; if the read block is not block G49 (determination: NO), the process proceeds to step SA03.

[Step SA03] Herein, svp, svr, sap, sar, sjp and sjr are worked out in a k-th interval (k-th block) on the basis of Expression (4) to Expression (22).

[Step SA04] Herein, svc(k), sac(k) and sjc(k) are worked out on the basis of svc(k)=Min(svp, svr), sac(k)=Min(sap, sar) and sjc(k)=Min(sjp, sjr).

[Step SA05] There is set k=k+1, a next block is read, and the process returns to step SA02.

Figure 14:
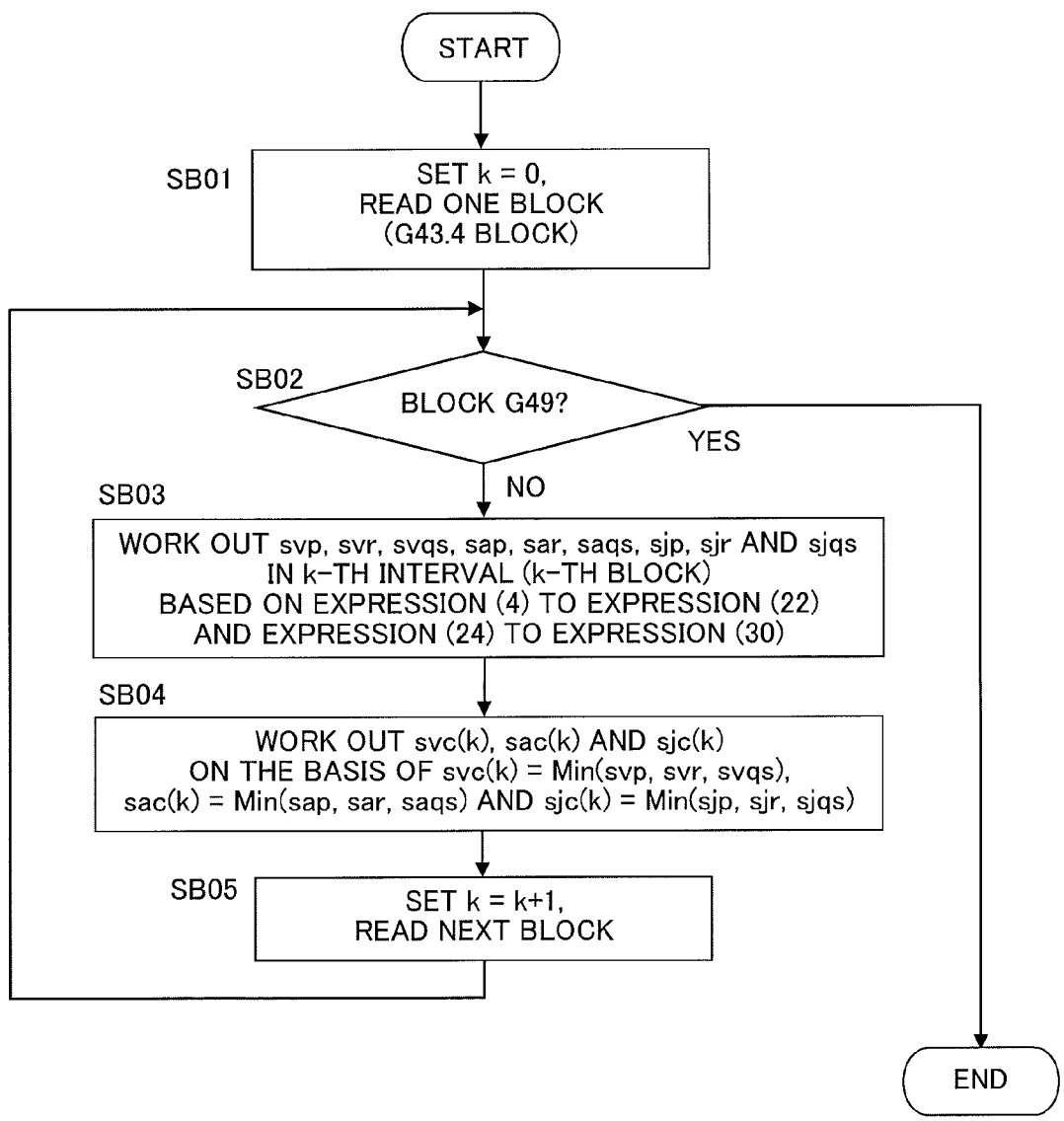
FIG. 14 is a flowchart illustrating a process in a clamp value computation unit in a second embodiment of the numerical controller according to the present invention.

FIG. 14 is a flowchart illustrating a process in a clamp value computation unit in a second embodiment of the numerical controller according to the present invention.

The process starts in block G43.4 of FIG. 4 and ends in block G49. Each division interval constitutes an instruction block unit. The number of the division interval is notated as k, and svc, sac and sjc of each division interval are represented with k as the index of svc, sac and sjc in each division interval. The various steps are explained next.

[Step SB01] There is set k=0, and one block (block G43.4) is read.

[Step SB02] It is determined whether or not the read block is block G49. If the read block is block G49 (determination: YES), the process is terminated; if the read block is not block G49 (determination: NO), the process proceeds to step SB03.

[Step SB03] Herein, svp, svr, svqs, sap, sar, sags, sjp, sjr and sjqs are worked out in a k-th interval (k-th block) on the basis of Expression (4) to Expression (22) and Expression (24) to Expression (30).

[Step SB04] Herein, svc(k), sac(k) and sjc(k) are worked out based on svc(k)=Min(svp, svr, svgs), sac(k)=Min(sap, sar, sags) and sjc(k)=Min(sjp, sjr, sjqs).

[Step SB05] There is set k=k+1, a next block is read, and the process returns to step SB02.

What is claimed is:

1. A numerical controller that controls a multi-axis machine tool in which a workpiece that is attached to a table is machined by at least three linear axes and one rotation axis, the numerical controller comprising:
an instructed path speed condition input unit that inputs, as an instructed path speed condition, an instructed path speed and an instructed path allowable acceleration of a tool center point with respect to the workpiece in an instructed path, which is a relative path of the tool center point with respect to the workpiece and is instructed by a machining program;
a driving axis speed condition input unit that inputs, as a driving axis speed condition, a driving axis allowable speed and a driving axis allowable acceleration for a driving axis;
a clamp value computation unit that computes an instructed path interval allowable speed and an instructed path interval allowable acceleration on the basis of the instructed path speed condition, for each of division intervals resulting from dividing the instructed path into a plurality of intervals, further computes a driving axis interval allowable speed and a driving axis interval allowable acceleration on the basis of the driving axis speed condition, sets the smaller value from among the instructed path interval allowable speed and the driving axis interval allowable speed to a speed clamp value, and sets the smaller value from among the instructed path interval allowable acceleration and the driving axis interval allowable acceleration to an acceleration clamp value;
a speed curve computation unit that computes a speed curve as a largest speed on the instructed path that does not exceed the speed clamp value or the acceleration clamp value; and
an interpolation unit that performs interpolation of the instructed path according to speed based on the speed curve, and computes a driving axis movement amount through conversion of an interpolated instructed path interpolation position to a driving axis position, wherein each axis is driven in accordance with the driving axis movement amount.

2. The numerical controller according to claim 1,
wherein the instructed path speed condition input unit inputs, as the instructed path speed condition, also an instructed path allowable jerk of the tool center point with respect to the workpiece in addition to the instructed path speed and the instructed path allowable acceleration,
the driving axis speed condition input unit inputs, as the driving axis speed condition, also a driving axis allowable jerk in addition to the driving axis allowable speed and the driving axis allowable acceleration,
the clamp value computation unit, for each of the division intervals:
computes also an instructed path interval allowable jerk in addition to the instructed path interval allowable speed and the instructed path interval allowable acceleration, on the basis of the instructed path speed condition that has been inputted;
computes also a driving axis interval allowable jerk in addition to the driving axis interval allowable speed and the driving axis interval allowable acceleration, on the basis of the driving axis speed condition that has been inputted; and
sets the smaller value from among the instructed path interval allowable jerk and the driving axis interval allowable jerk to a jerk clamp value, in addition to the speed clamp value and the acceleration clamp value, and
the speed curve computation unit computes a speed curve as a largest speed on the instructed path that does not exceed the jerk clamp value either in addition to the speed clamp value and the acceleration clamp value.

3. The numerical controller according to claim 1, further comprising:
a tool reference point path speed condition input unit that inputs, as a tool reference point path speed condition, a tool reference point path allowable speed and a tool reference point path allowable acceleration of a tool reference point with respect to the workpiece in a tool reference point path being a relative path, with respect to the workpiece, of a tool reference point being a reference point on the tool which is different from the tool center point,
wherein the clamp value computation unit, for each of the division intervals:
computes the instructed path interval allowable speed and the instructed path interval allowable acceleration, on the basis of the instructed path speed condition that has been inputted;
computes the driving axis interval allowable speed and the driving axis interval allowable acceleration, on the basis of the driving axis speed condition that has been inputted;
further computes a tool reference point path interval allowable speed and a tool reference point path interval allowable acceleration, on the basis of the tool reference point path speed condition that has been inputted; and
sets, to the speed clamp value, the smallest value from among the instructed path interval allowable speed, the driving axis interval allowable speed and the tool reference point path interval allowable speed, and sets, to the acceleration clamp value, the smallest value from among the instructed path interval allowable acceleration, the driving axis interval allowable acceleration and the tool reference point path interval allowable acceleration.

4. The numerical controller according to claim 3, wherein:
the tool reference point path speed condition input unit inputs, as a tool reference point speed condition, a tool reference point path allowable jerk of the tool center point with respect to the workpiece, in addition to the tool reference point path allowable speed and the tool reference point path allowable acceleration; and wherein
the clamp value computation unit computes, for each of the division intervals, also a tool reference point path interval allowable jerk on the basis of the tool reference point path speed condition, in addition to the instructed path interval allowable speed, the instructed path interval allowable acceleration, the instructed path interval allowable jerk, the driving axis interval allowable speed, the driving axis interval allowable acceleration, the driving axis interval allowable jerk, the tool reference point path interval allowable speed and the tool reference point path interval allowable acceleration; and
the clamp value computation unit sets, in addition to the speed clamp value and the acceleration clamp value, the smallest value from among the instructed path interval allowable jerk, the driving axis interval allowable jerk and the tool reference point path interval allowable jerk, to the jerk clamp value; and
the speed curve computation unit computes a speed curve as a largest speed on the instructed path that does not exceed the jerk clamp value either in addition to the speed clamp value and the acceleration clamp value.

5. The numerical controller according to claim 1, wherein the multi-axis machine tool is a table rotation-type five-axis machine tool having three linear axes and two rotation axes about which a table rotates.

6. The numerical controller according to claim 1, wherein the multi-axis machine tool is a tool head rotation-type five-axis machine tool having three linear axes and two rotation axes about which a tool head rotates.

7. The numerical controller according to claim 1, wherein the multi-axis machine tool is a mixed five-axis machine tool having three linear axes, one rotation axis about which a tool head rotates, and one rotation axis about which a table rotates.

8. The numerical controller according to claim 2, wherein the multi-axis machine tool is a table rotation-type five-axis machine tool having three linear axes and two rotation axes about which a table rotates.

9. The numerical controller according to claim 3, wherein the multi-axis machine tool is a table rotation-type five-axis machine tool having three linear axes and two rotation axes about which a table rotates.

10. The numerical controller according to claim 4, wherein the multi-axis machine tool is a table rotation-type five-axis machine tool having three linear axes and two rotation axes about which a table rotates.

11. The numerical controller according to claim 2, wherein the multi-axis machine tool is a tool head rotation-type five-axis machine tool having three linear axes and two rotation axes about which a tool head rotates.

12. The numerical controller according to claim 3, wherein the multi-axis machine tool is a tool head rotation-type five-axis machine tool having three linear axes and two rotation axes about which a tool head rotates.

13. The numerical controller according to claim 4, wherein the multi-axis machine tool is a tool head rotation-type five-axis machine tool having three linear axes and two rotation axes about which a tool head rotates.

14. The numerical controller according to claim 2, wherein the multi-axis machine tool is a mixed five-axis machine tool having three linear axes, one rotation axis about which a tool head rotates, and one rotation axis about which a table rotates.

15. The numerical controller according to claim 3, wherein the multi-axis machine tool is a mixed five-axis machine tool having three linear axes, one rotation axis about which a tool head rotates, and one rotation axis about which a table rotates.

16. The numerical controller according to claim 4, wherein the multi-axis machine tool is a mixed five-axis machine tool having three linear axes, one rotation axis about which a tool head rotates, and one rotation axis about which a table rotates.

* * * * *